(12) United States Patent
Yamashita et al.

(10) Patent No.: US 12,731,484 B2
(45) Date of Patent: Sep. 8, 2026

(54) INFORMATION NOTIFICATION SYSTEM, INFORMATION NOTIFICATION METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Masahiro Yamashita, Seto (JP); Takashi Yamaguchi, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 18/374,711

(22) Filed: Sep. 29, 2023

(65) Prior Publication Data

US 2024/0135812 A1 Apr. 25, 2024
US 2024/0233531 A9 Jul. 11, 2024

(30) Foreign Application Priority Data

Oct. 19, 2022 (JP) ................................. 2022-167880

(51) Int. Cl.
*G08G 1/0962* (2006.01)
*G06T 11/00* (2026.01)
*G08G 1/0967* (2006.01)

(52) U.S. Cl.
CPC .......... *G08G 1/09623* (2013.01); *G06T 11/00* (2013.01); *G08G 1/0967* (2013.01); *G06T 2200/24* (2013.01)

(58) Field of Classification Search
CPC ............. G08G 1/0962; G08G 1/09623; G08G 1/0967; G08G 1/096716; G08G 1/096758;

(Continued)

(56) References Cited

U.S. PATENT DOCUMENTS 9,964,950 B2 5/2018 Takano
10,017,116 B2 7/2018 Sato (Continued)

FOREIGN PATENT DOCUMENTS

DE 102013007974 B3 * 10/2014 ....... G08G 1/096716
EP 1519342 A1 3/2005

(Continued)

OTHER PUBLICATIONS

GreyTesla, "Off Set the Default Speed Limit! | Tesla Quick Tips", Mar. 22, 2020, Published on YouTube, https://www.youtube.com/watch?v=XqUUbFMcbm0 (Year: 2020).*

*Primary Examiner* — Kee M Tung
*Assistant Examiner* — Thang Gia Huynh
(74) *Attorney, Agent, or Firm* — Dinsmore & Shohl LLP

(57) ABSTRACT

An information notification system displays a notification to a user of a vehicle on a display device. A first type notification is a notification of road traffic information on a road or traffic around the vehicle. A second type notification is a notification of information not belonging to the road traffic information or a notification that no road traffic information is available. The information notification system prohibits overlaying the first type notification and the second type notification when displayed on the display device. When the display device has only a single display area for displaying the notification, the information notification system selects and displays one of the first type notification and the second type notification in the single display area.

12 Claims, 10 Drawing Sheets

(58) Field of Classification Search
CPC . G08G 1/09626; G06T 11/00; G06T 2200/24; G06F 3/1407; G06F 9/451; B60K 2360/178; B60K 2360/186; B60K 2360/11; B60K 35/21; B60K 35/29; B60K 35/81; B60K 35/00
See application file for complete search history.

(56) References Cited

U.S. PATENT DOCUMENTS

| | | | | |
|---|---|---|---|---|
| 10,310,508 | B2 | 6/2019 | Kunisa et al. | |
| 10,452,930 | B2 | 10/2019 | Sato | |
| 10,663,973 | B2 | 5/2020 | Hashimoto et al. | |
| 10,720,054 | B2 * | 7/2020 | Kukimoto .............. | B60K 35/28 |
| 10,895,875 | B2 | 1/2021 | Hashimoto et al. | |
| 11,001,198 | B2 | 5/2021 | Morimura et al. | |
| 11,275,382 | B2 | 3/2022 | Hashimoto et al. | |
| 2010/0185980 | A1 * | 7/2010 | Kuo ...................... | H04M 1/724 715/810 |
| 2010/0207787 | A1 | 8/2010 | Catten et al. | |
| 2017/0174132 | A1 | 6/2017 | Yokochi | |
| 2021/0229598 | A1 | 7/2021 | Morimura et al. | |
| 2021/0335036 | A1 | 10/2021 | Li et al. | |
| 2021/0380124 | A1 | 12/2021 | Urano et al. | |

FOREIGN PATENT DOCUMENTS

| | | | | |
|---|---|---|---|---|
| JP | 2008-164507 | A | | 7/2008 |
| JP | 2017-117041 | A | | 6/2017 |
| JP | 2022023080 | A | * | 2/2022 |

* cited by examiner

| | | |
|---|---|---|
| FIRST TYPE NOTIFICATION (N1) | TRAFFIC SIGN NOTIFICATION (N11) | STOP 50 |
| | SPEED LIMIT NOTIFICATION (N12) | 50 100 6-19h |
| | TRAFFIC SIGNAL NOTIFICATION (N13) | |
| | TRAFFIC JAM NOTIFICATION (N14) | |
| | ACCIDENT NOTIFICATION (N15) | |
| SECOND TYPE NOTIFICATION (N2) | USER SETTING NOTIFICATION (N21) | |
| | AUXILIARY NOTIFICATION (N22) | |

*FIG. 4*

INFORMATION NOTIFICATION SYSTEM, INFORMATION NOTIFICATION METHOD, AND NON-TRANSITORY COMPUTER-READABLE RECORDING MEDIUM

CROSS-REFERENCES TO RELATED APPLICATION

The present disclosure claims priority to Japanese Patent Application No. 2022-167880, filed on Oct. 19, 2022, the contents of which application are incorporated herein by reference in their entirety.

TECHNICAL FIELD

The present disclosure relates to a technique for notifying a user of a vehicle of information. In particular, the present disclosure relates to a technique for displaying a notification to a user of a vehicle on a display device.

BACKGROUND ART

Patent Literature 1 discloses a sign display device for a vehicle that displays sign information to an occupant. When a plurality of pieces of sign information are detected or when a large amount of character information is included in the sign information, the sign display device displays simplified information obtained by simplifying the sign information.

LIST OF RELATED ART

Patent Literature 1: Japanese Laid-Open Patent Application No. JP-2017-117041

SUMMARY

A technique for displaying a notification to a user of a vehicle on a display device is considered. In some cases, the display device has a limited area for displaying the notification. In such a case, it is conceivable to perform overlay display that overlays and displays a plurality of notifications on the limited display area. However, the user of the vehicle may feel a sense of strangeness with the overlay display, depending on types of the plurality of notifications subject to the overlay display.

An object of the present disclosure is to provide a technique capable of suppressing a user's sense of strangeness when a notification to a user of a vehicle is displayed on a display device.

A first aspect is directed to an information notification system.

The information notification system includes one or more processors configured to display a notification to a user of a vehicle on a display device.

A first type notification is a notification of road traffic information on a road or traffic around the vehicle.

A second type notification is a notification of information not belonging to the road traffic information or a notification that no road traffic information is available.

The one or more processors are further configured to prohibit overlaying the first type notification and the second type notification when displayed on the display device. When the display device has only a single display area for displaying the notification, the one or more processors are further configured to select and display one of the first type notification and the second type notification in the single display area.

A second aspect is directed to an information notification method for displaying a notification to a user of a vehicle on a display device.

A first type notification is a notification of road traffic information on a road or traffic around the vehicle/

A second type notification is a notification of information not belonging to the road traffic information or a notification that no road traffic information is available.

The information notification method includes:

- prohibiting overlaying the first type notification and the second type notification when displayed on the display device; and
- when the display device has only a single display area for displaying the notification, selecting and displaying one of the first type notification and the second type notification in the single display area.

A third aspect is directed to an information notification program for displaying a notification to a user of a vehicle on a display device.

A first type notification is a notification of road traffic information on a road or traffic around the vehicle.

A second type notification is a notification of information not belonging to the road traffic information or a notification that no road traffic information is available.

The information notification program, when executed by a computer, causes the computer to execute:

- prohibiting overlaying the first type notification and the second type notification when displayed on the display device; and
- when the display device has only a single display area for displaying the notification, selecting and displaying one of the first type notification and the second type notification in the single display area.

According to the present disclosure, overlaying of the first type notification and the second type notification having different meanings is prohibited. It is thus possible to prevent the user from feeling a sense of strangeness with the notification. In addition, it is possible to prevent the user from confusing the notifications.

BRIEF DESCRIPTION OF DRAWINGS

FIG. 4 is a conceptual diagram showing examples of notifications according to an embodiment;

DETAILED DESCRIPTION

Embodiments of the present disclosure will be described with reference to the accompanying drawings.

1. Information Notification System

Figure 1:
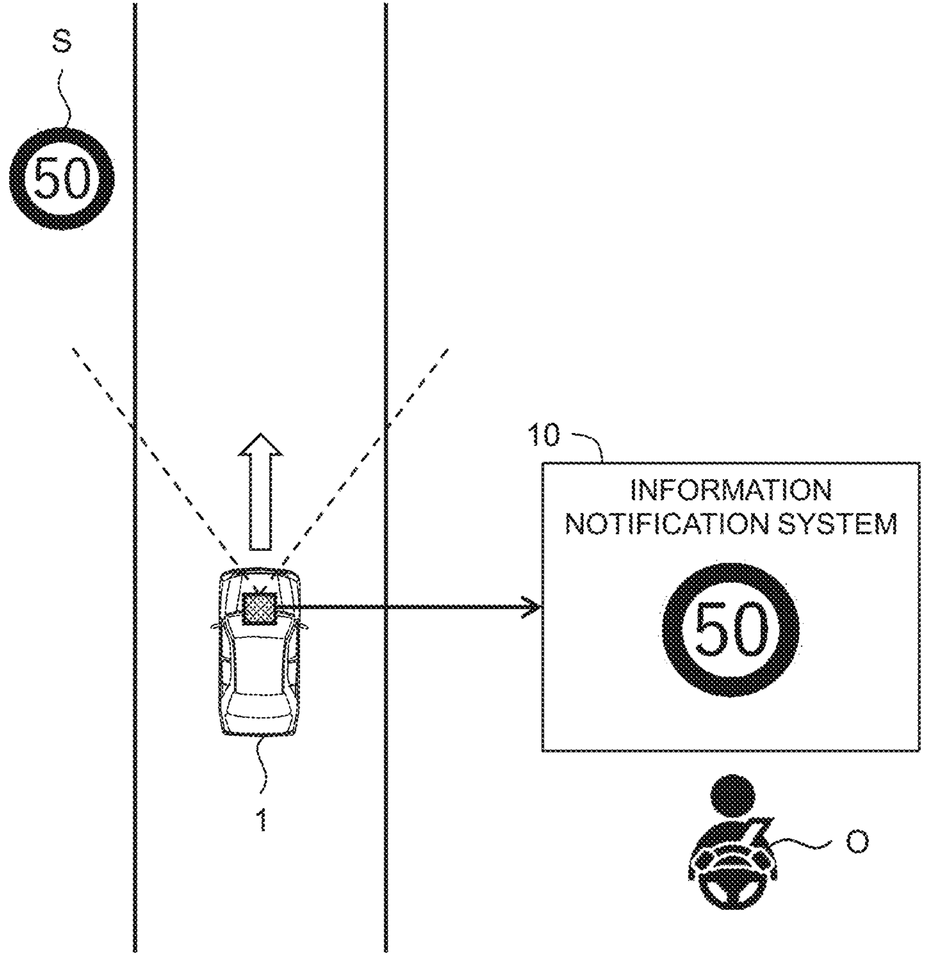
FIG. 1 is a conceptual diagram for explaining an overview of an information notification system according to an embodiment.

FIG. 1 is a conceptual diagram for explaining an overview of an information notification system 10 according to the present embodiment. The information notification system 10 notifies a user O of a vehicle 1 of information. For example, the user O of the vehicle 1 is an operator of the vehicle 1. The operator of the vehicle 1 may be a driver in the vehicle 1 or a remote operator who remotely operates (remotely drives or remotely supports) the vehicle 1. The user O of the vehicle 1 may be an occupant in the vehicle 1. The vehicle 1 may be an autonomous driving vehicle. The information notification system 100 may be installed on the vehicle 1, or may be included in a remote operator terminal operated by the remote operator. Alternatively, the information notification system 100 may be distributed to the vehicle 1 and the remote operator terminal.

The information notification system 10 is provided with a display device and displays a notification to the user O on the display device. For example, the information notification system 10 recognizes a traffic sign S installed on a road on which the vehicle 1 travels, and displays a content of the recognized traffic sign S. However, types of the notification are not limited thereto. Various examples of the notification to the user O will be described later.

Figure 2:
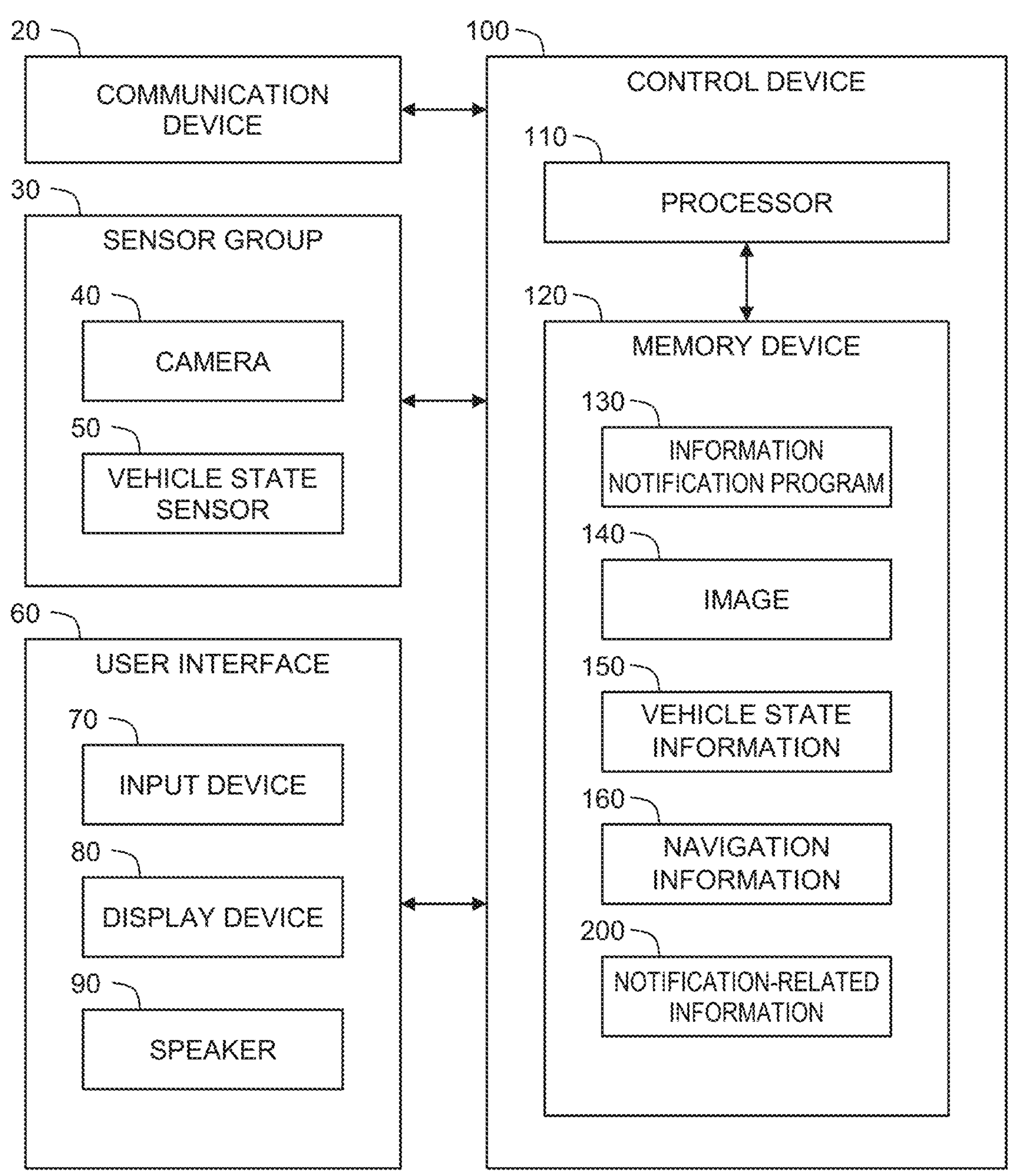
FIG. 2 is a block diagram showing a configuration example of an information notification system according to an embodiment.

FIG. 2 is a block diagram showing a configuration example of the information notification system 10 according to the present exemplary embodiment. The information notification system 10 includes a communication device 20, a sensor group 30, a user interface 60, and a control device (controller) 100.

The communication device 20 communicates with the outside of the information notification system 10. For example, the communication device 20 communicates with a map management server that manages high-definition three-dimensional map information. As another example, the communication device 20 may communicate with an information service center that collects and distributes a variety of real-time information (e.g., traffic jam information, accident information, and signal indication information).

The sensor group 30 is mounted on the vehicle 1. The sensor group 30 includes a camera 40, a vehicle state sensor 50, and the like. The camera 40 takes a picture of a situation around the vehicle 1 and captures an image 140 indicating the situation around the vehicle 1. The vehicle state sensor 50 detects a state of the vehicle 1. For example, the vehicle state sensor 50 detects a speed of the vehicle 1. In addition, the sensor group 30 may include a recognition sensor such as a LIDAR and the like.

The user interface 60 receives an input of information from the user O of the vehicle 1 and presents information to the user O of the vehicle 1. When the user O is a driver or an occupant on board the vehicle 1, the user interface 60 is mounted on the vehicle 1. When the user O is a remote operator who remotely operates the vehicle 1, the user interface 60 is included in the remote operator terminal.

The user interface 60 includes an input device 70, a display device 80, and a speaker 90. Examples of the input device 70 include a touch panel, a switch, and the like. Examples of the display device 80 include a meter panel, a display, a head-up display (HUD), and the like.

The control device 100 is a computer that controls the information notification system 10. The control device 100 includes one or more processors 110 (hereinafter, simply referred to as a processor 110) and one or more memory devices 120 (hereinafter, simply referred to as a memory device 120). The processor 110 executes a variety of processing. For example, the processor 110 includes a central processing unit (CPU). The memory device 120 stores a variety of information. Examples of the memory device 120 include a volatile memory, a nonvolatile memory, a hard disk drive (HDD), a solid state drive (SSD), and the like. It should be noted that the one or more processors 110 may be installed on the vehicle 1, may be included in the remote operator terminal, or may be distributed to the vehicle 1 and the remote operator terminal. Similarly, the one or more memory devices 120 may be installed on the vehicle 1, may be included in the remote operator terminal, or may be distributed to the vehicle 1 and the remote operator terminal.

An information notification program 130 is a computer program for controlling the information notification system 10. A variety of processing by the information notification system 10 may be implemented by the processor 110 executing the information notification program 130. The information notification program 130 is stored in the memory device 120. Alternatively, the information notification program 130 may be recorded on a non-transitory computer-readable recording medium.

The memory device 120 further stores an image 140, vehicle state information 150, navigation information 160, notification-related information 200, and the like.

The image 140 is captured by the camera 40 mounted on the vehicle 1. When the processor 110 is included in the remote operator terminal, the processor 110 communicates with the vehicle 1 to acquire the image 140.

The vehicle state information 150 is acquired by the vehicle state sensor 50 mounted on the vehicle 1. For example, the vehicle state information 150 includes the speed of the vehicle 1. When the processor 110 is included in the remote operator terminal, the processor 110 communicates with the vehicle 1 to acquire the vehicle state information 150.

The navigation information 160 includes map information and position information of the vehicle 1. The position information of the vehicle 1 is acquired from an in-vehicle system that controls the vehicle 1. The map information is stored in advance in the memory device 120. Alternatively, the map information may be high-definition three-dimensional map information provided from a map management server. The processor 110 is able to acquire the high-definition three-dimensional map information from the map management server via the communication device 20.

The processor 110 displays a notification to the user O of the vehicle 1 on the display device 80. The notification-related information 200 is information related to the notification. Hereinafter, various examples of the notification-related information 200 will be described in detail.

2. Examples of Notification-Related Information

Figure 3:
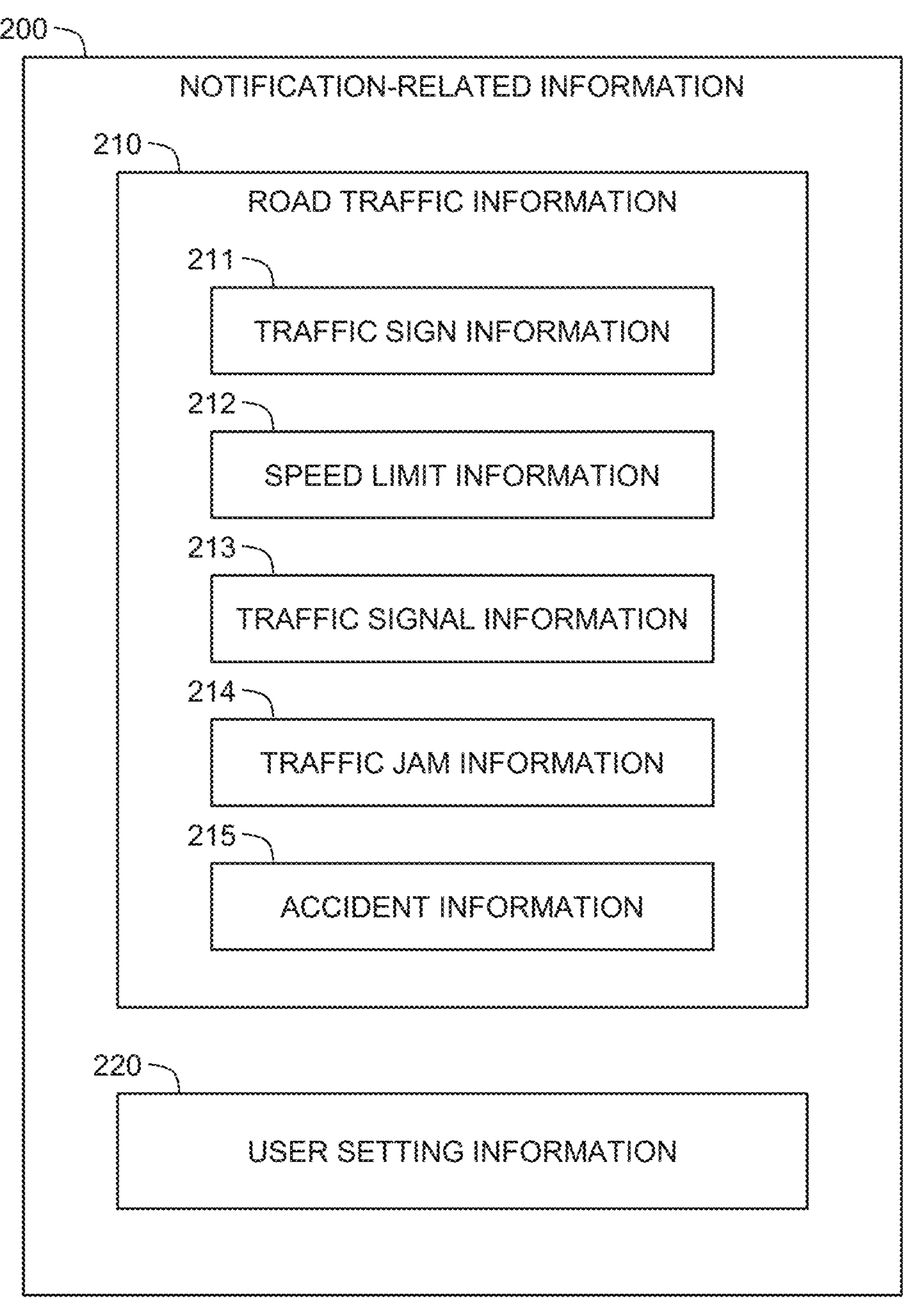
FIG. 3 is a block diagram showing examples of notification-related information according to an embodiment.

FIG. 3 is a block diagram showing examples of the notification-related information 200.

2-1. Road Traffic Information

The notification-related information 200 includes road traffic information 210. The road traffic information 210 is information on a roads or traffic around the vehicle 1. Examples of the road traffic information 210 include traffic sign information 211, speed limit information 212, traffic signal information 213, traffic jam information 214, accident information 215, and the like.

2-1-1. Traffic Sign Information

The traffic sign information 211 is information indicating a content of a traffic sign installed on a road around the vehicle 1. Examples of the traffic sign include a stop sign, a speed limit sign, a no-passing sign, and the like. The processor 110 recognizes the traffic sign by analyzing the image 140 captured by the camera 40. Typically, the processor 110 recognizes the traffic sign from the image 140 by using image recognition AI (Artificial Intelligence). The image recognition AI is generated in advance through a learning method such as deep learning. For example, the image recognition AI is trained to detect a variety of traffic signs in the image 140 and to identify a type of each detected traffic sign.

The processor 110 may determine whether the recognized traffic sign is related to the vehicle 1. For example, while the vehicle 1 is traveling in a first lane, a traffic sign installed in another lane may be recognized. Therefore, when a lateral position of a certain traffic sign with respect to the vehicle 1 is equal to or greater than a threshold value, the processor 110 may determine that the certain traffic sign is not installed in the first lane, that is, the certain traffic sign is unrelated to the vehicle 1. As another example, no stop sign is present on an expressway. Therefore, the processor 110 may determine that a stop sign recognized when the speed of the vehicle 1 is equal to or higher than a threshold value is unrelated to the vehicle 1. Information on the traffic sign unrelated to the vehicle 1 may be excluded from the traffic sign information 211.

As another example, an installation position and a type for each traffic sign may be registered in the map information (high-definition three-dimensional map information). In this case, the processor 110 may acquire the traffic sign information 211 from the map information. That is, the processor 110 may acquire the traffic sign information 211 from the navigation information 160 described above.

2-1-2. Speed Limit Information

The speed limit information 212 is information on a speed limit of a road on which the vehicle 1 is traveling. For example, when recognizing a speed limit sign installed on a road, the processor 110 may read numbers (figures) shown on the speed limit sign based on the image of the recognized speed limit sign. In other words, the processor 110 may recognize the speed limit designated by the speed limit sign on the basis of the image of the recognized speed limit sign.

As another example, a speed limit for each road may be registered in the map information (high-definition three-dimensional map information). In this case, the processor 110 may acquire the speed limit information 212 from the map information. That is, the processor 110 may acquire the speed limit information 212 from the navigation information 160 described above.

As still another example, the processor 110 may identify a road type (for example, an expressway) of a road on which the vehicle 1 is traveling based on the navigation information 160. Then, the processor 110 may acquire a legal speed limit set for the road type as the speed limit information 212.

2-1-3. Traffic Signal Information

The traffic signal information 213 indicates whether a traffic signal (traffic light) is present or not within a certain range ahead of the vehicle 1. For example, an installation position of each traffic signal is registered in the map information (high-definition three-dimensional map information). In this case, the processor 110 is able to determine, based on the navigation information 160, whether a traffic signal is present or not within a certain range ahead of the vehicle 1.

The traffic signal information 213 may indicate a signal indication (blue, yellow, red) of the traffic signal present ahead of the vehicle 1. For example, the processor 110 recognizes a traffic signal by analyzing the image 140 captured by the camera 40. Further, the processor 110 recognizes the signal indication of the traffic signal by analyzing the image 140 of the traffic signal.

As another example, real-time information of signal indications of a large number of traffic signals may be aggregated in an information service center. In this case, the processor 110 can communicate with the information service center via the communication device 20 to acquire information of the signal indication of the traffic signal present ahead of the vehicle 1. The position of the vehicle 1 is obtained from the navigation information 160.

As yet another example, a traffic signal itself may transmit its own signal indication information. In this case, the processor 110 can communicate with the traffic signal via the communication device 20 to acquire the signal indication information of the traffic signal.

The traffic signal information 213 includes at least one of presence or absence of the traffic signal and the signal indication described above.

2-1-4. Traffic Jam Information

The traffic jam information 214 is information indicating a traffic jam status of a road ahead of the vehicle 1. For example, real-time traffic jam status information at various locations is aggregated in an information service center. The processor 110 can communicate with the information service center via the communication device 20 to acquire the traffic jam information 214 regarding the road ahead of the vehicle 1. The position of the vehicle 1 is obtained from the navigation information 160.

2-1-5. Accident Information

The accident information 215 is information indicating presence or absence of an accident on a road ahead of the vehicle 1. For example, real-time accident information at various locations is aggregated in an information service center. The processor 110 can communicate with the information service center via the communication device 20 to acquire the accident information 215 regarding the road ahead of the vehicle 1. The position of the vehicle 1 is obtained from the navigation information 160.

2-2. User Setting Information

The notification-related information 200 further includes user setting information 220. The user setting information 220 is information regarding a setting customized by the user O of the vehicle 1. The user O can customize a variety of settings by the use of the input device 70.

As an example, a "speed warning function" is considered. The speed warning function is a function of issuing a warning to the user O when the speed of the vehicle 1 exceeds the speed limit. The speed of the vehicle 1 is obtained from the vehicle state information 150. The speed limit is obtained from the speed limit information 212 described above. The processor 110 determines whether or not the speed of the vehicle 1 exceeds the speed limit. When the speed of the vehicle 1 exceeds the speed limit, the processor 110 issues a warning to the user O via the user interface 60. For example, the processor 110 emits a warning sound from the speaker 90. As another example, the processor 110 may display an alert on the display device 80.

The user O can turn ON or OFF the speed warning function by the use of the input device 70. Here, "turning ON" means activation and "turning OFF" means deactivation. When the speed warning function is turned OFF, no warning is issued even if the speed of the vehicle 1 exceeds the speed limit. The user setting information 220 indicates whether the speed warning function is turned ON or OFF.

As another example, the user setting information 220 may indicate ON/OFF of a driving assist function. Examples of the driving assist function include an automated driving function, a risk avoidance control function, a lane departure prevention function, and the like. The risk avoidance control function automatically performs at least one of steering control and deceleration control in order to reduce a risk of collision between the vehicle 1 and an object (e.g., a surrounding vehicle, a pedestrian). The lane departure prevention function prevents the vehicle 1 from departing from a travel lane.

3. Variety of Notifications

FIG. 4 is a conceptual diagram showing various examples of the notification to the user O displayed on the display device 80. The notifications to the user O are roughly classified into a "first type notification N1" and a "second type notification N2."

3-1. First Type Notification

The first type notification N1 is a notification of the road traffic information 210 described in the above Section 2-1. That is, the first type notification N1 notifies the user O of the information on the road or traffic around the vehicle 1. Examples of the first type notification N1 include a traffic sign notification N11, a speed limit notification N12, a traffic signal notification N13, a traffic jam notification N14, an accident notification N15, and the like.

The traffic sign notification N11 is a notification of the traffic sign information 211. For example, the image itself of the traffic sign recognized by using the camera 40 is used as the traffic sign notification N11. As another example, an icon representing the traffic sign may be used as the traffic sign notification N11.

The speed limit notification N12 is a notification of the speed limit information 212. For example, an icon or characters (numbers, figures) representing the speed limit are used as the speed limit notification N12. As another example, the image itself of the speed limit sign recognized by using the camera 40 may be used as the speed limit notification N12. As still another example, an icon representing the speed limit sign may be used as the speed limit notification N12.

The traffic signal notification N13 is a notification of the traffic signal information 213. For example, an icon or characters representing the presence or absence of the traffic signal are used as the traffic signal notification N13. As another example, a predetermined icon or character s representing the signal indication are used as the traffic signal notification N13.

The traffic jam notification N14 is a notification of the traffic jam information 214. For example, an icon or characters representing the presence or absence of the traffic jam are used as the traffic jam notification N14.

The accident notification N15 is a notification of the accident information 215. For example, an icon or characters representing the presence or absence of the accident are used as the accident notification N15.

3-2. Second Type Notification

The second type notification N2 is a notification other than the first type notification N1 described above. That is, the second type notification N2 is a notification of information not belonging to the road traffic information 210. Alternatively, the second type notification N2 may be a notification that no road traffic information 210 is available.

An example of the second type notification N2 is a "user setting notification N21" regarding the setting customized by the user O. The content of the setting customized by the user O is obtained from the user setting information 220 described in the above Section 2-2.

For example, as described above, the user O can turn ON or OFF the speed warning function. When the speed warning function is turned OFF, no warning is issued even if the speed of the vehicle 1 exceeds the speed limit. In some embodiments, the user O may be notified of a fact that "the speed warning function is turned OFF." The user setting notification N21 includes such a speed warning function-OFF notification (i.e., a notification that the speed warning function is turned OFF). For example, a predetermined icon is used as the speed warning function-OFF notification.

As another example, the user setting notification N21 may include a notification that "the driving assist function is turned ON" or "the driving assist function is turned OFF."

Another example of the second type notification N2 is an "auxiliary notification N22." The auxiliary notification N22 notifies that no road traffic information 210 to be displayed is acquired although there is a function of displaying the first type notification N1. For example, the above-described speed limit notification N12 notifies the speed limit of the road on which the vehicle 1 is traveling. However, when the speed limit information 212 at a travel position of the vehicle 1 cannot be acquired, it is not possible to display the speed limit notification N12. Instead, the auxiliary notification N22 that no speed limit information 212 is available although there is a function of displaying the speed limit notification N12 may be displayed. For example, a predetermined icon is used as the auxiliary notification N22.

In addition, the second type notification N2 may include a notification that requests the user O to perform hands-on.

4. Example of Notification Display Process

The processor 110 displays a necessary notification on the display device 80 based on the notification-related information 200. The display device 80 has one or more display areas for displaying notifications. The display area is hereinafter referred to as a slot. One slot is large enough to display one notification, but is not large enough to display two or more notifications without overlay (overlapping).

Figure 5:
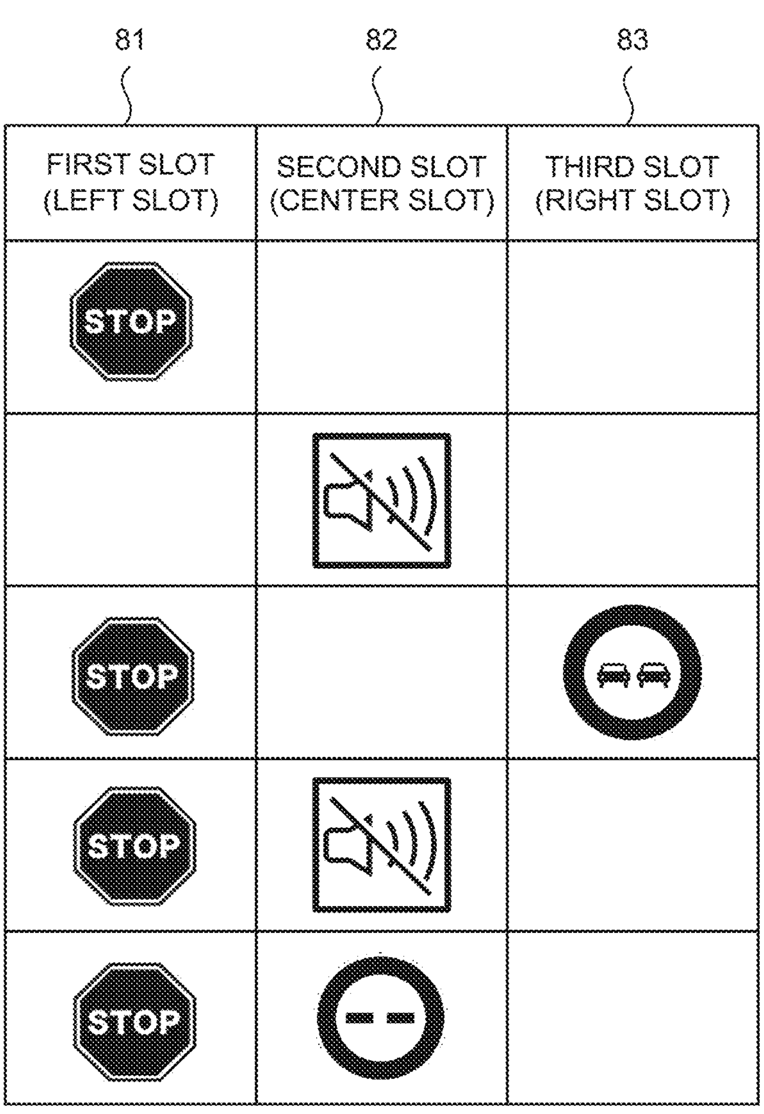
FIG. 5 is a conceptual diagram showing an example of a notification display process according to an embodiment.

FIG. 5 shows an example of the notification display process. In the example shown in FIG. 5, the display device 80 has a first slot 81, a second slot 82, and a third slot 83. For example, the first type notification N1 is displayed in the first slot 81 and/or the third slot 83, and the second type notification N2 is displayed in the second slot 82.

Figure 6:
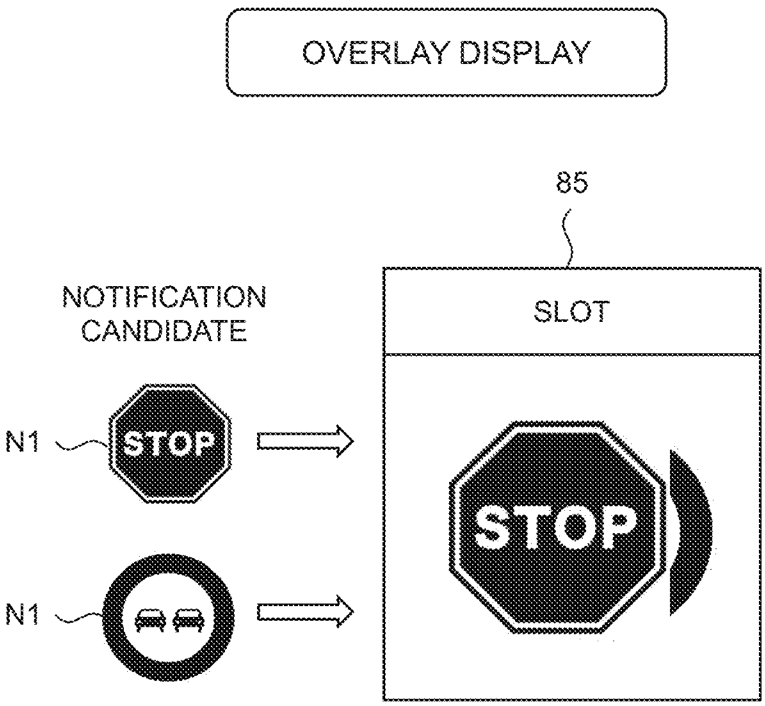
FIG. 6 is a conceptual diagram showing an example of an overlay display process according to an embodiment.

FIG. 6 shows another example of the notification display process. In the example shown in FIG. 6, space is limited, and the display 80 has only a single slot 85. Here, when there are a plurality of notification candidates, it is conceivable to overlay and display the plurality of notifications in the single slot 85. Overlaying a plurality of notifications when displayed is hereinafter referred to as "overlay display." In the example shown in FIG. 6, a plurality of first type notifications N1 are overlaid and displayed in the single slot 85. In the case of the overlay display, a notification other than a foreground notification is partially hidden by the foreground notification. For example, the user O can see that there are a plurality of notifications, but need not see a content of a hidden notification other than the foreground notification. That is, the overlay display may be performed such that it can be seen that there are a plurality of notifications but the content of the hidden notification other than the foreground notification cannot be seen. In the case of the overlay display, it may not be possible to shift the respective positions of the notifications.

Figure 7:
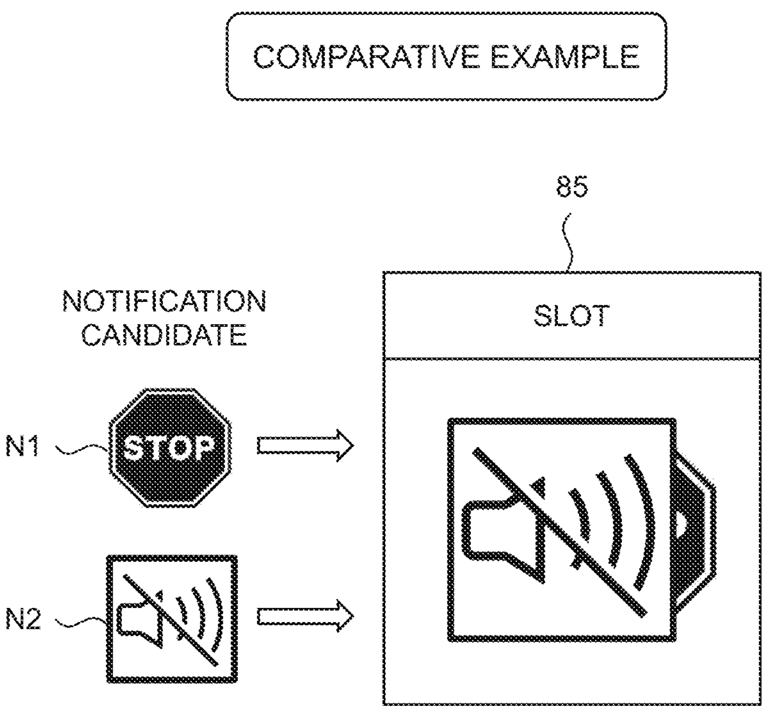
FIG. 7 is a conceptual diagram for explaining a comparative example.

FIG. 7 shows another example (comparative example) of the notification display process. In the example shown in FIG. 7, the notification candidates include both the first type notification N1 and the second type notification N2, and the first type notification N1 and the second type notification N2 are overlaid and displayed in the single slot 85. However, there is a concern that the user O may feel a sense of strangeness with such the overlay display of the first type notification N1 and the second type notification N2. The reason is that the first type notification N1 regarding the road traffic information 210 and the second type notification N2 other than the first type notification have fundamentally different meanings. Even when the first type notification N1 and the second type notification N2 having greatly different meanings are overlaid and displayed, it is difficult for the user O to immediately understand them. This causes the user O's sense of strangeness. In addition, the user O may confuse the first type notification N1 and the second type notification N2 having different meanings.

In view of the above, according to the present embodiment, the overlay display of the first type notification N1 and the second type notification N2 is prohibited. That is, when the notification candidates include both the first type notification N1 and the second type notification N2, the processor 110 prohibits overlaying the first type notification N1 and the second type notification N2 in the single slot 85. It is thus possible to prevent the user O from feeling a sense of strangeness with the notification. In addition, it is possible to prevent the user O from confusing the notifications.

5. Selective Display Process

A case where the display device 80 has only a single slot 85 and the notification candidates include both the first type notification N1 and the second type notification N2 is considered. In this case, the processor 110 selects only one of the first type notification N1 and the second type notification N2, and displays the selected one in the single slot 85. This process is hereinafter referred to as a "selective display process." A specific example of the selective display process will be described below.

5-1. First Example

Figure 8:
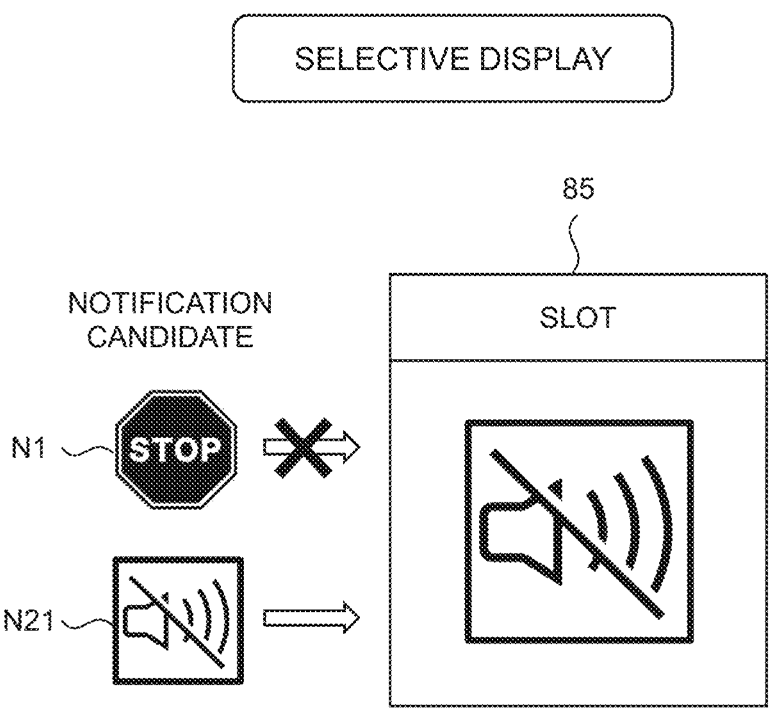
FIG. 8 is a conceptual diagram showing a first example of a selective display process according to an embodiment.

FIG. 8 is a conceptual diagram showing a first example of the selective display process. In the first example, the notification candidates include both the first type notification N1 and the user setting notification N21. In this case, priority is given to the user setting notification N21. That is, the processor 110 selects the user setting notification N21. The processor 110 displays only the user setting notification N21 in the single slot 85 without displaying the first type notification N1 in the single slot 85. Thus, the user O is able to clearly recognize the user setting notification N21. As a result, the sense of strangeness and the confusion are suppressed.

For example, the user setting notification N21 is the speed warning function-OFF notification. The user O is able to clearly recognize that the speed warning function is turned OFF.

5-2. Second Example

Figure 9:
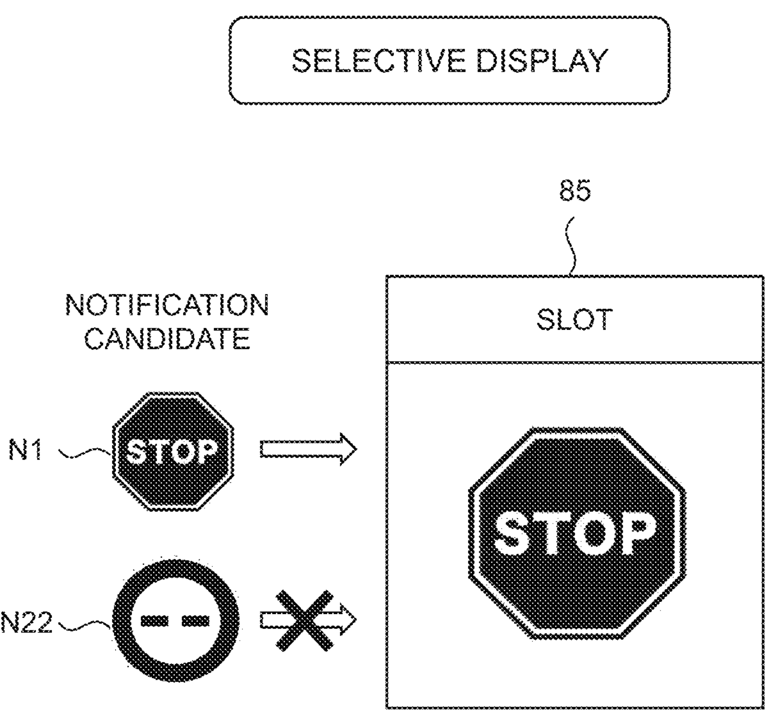
FIG. 9 is a conceptual diagram showing a second example of a selective display process according to an embodiment.

FIG. 9 is a conceptual diagram showing a second example of the selective display process. In the second example, the notification candidates include the first type notification N1 and the auxiliary notification N22. In this case, priority is given to the first type notification N1, because the first type notification N1 is considered to be more useful for the user O. That is, the processor 110 selects the first type notification N1. The processor 110 displays only the first type notification N1 in the single slot 85 without displaying the auxiliary notification N22 in the single slot 85. Thus, the user O is able to clearly recognize the first type notification N1. As a result, the sense of strangeness and the confusion are suppressed.

6. Example of Overlay Display Process

The processor 110 permits the overlay display of a plurality of first type notifications N1. For example, as shown in FIG. 6, the processor 110 may overlay and display the plurality of first type notifications N1 in the single slot 85.

Figure 10:
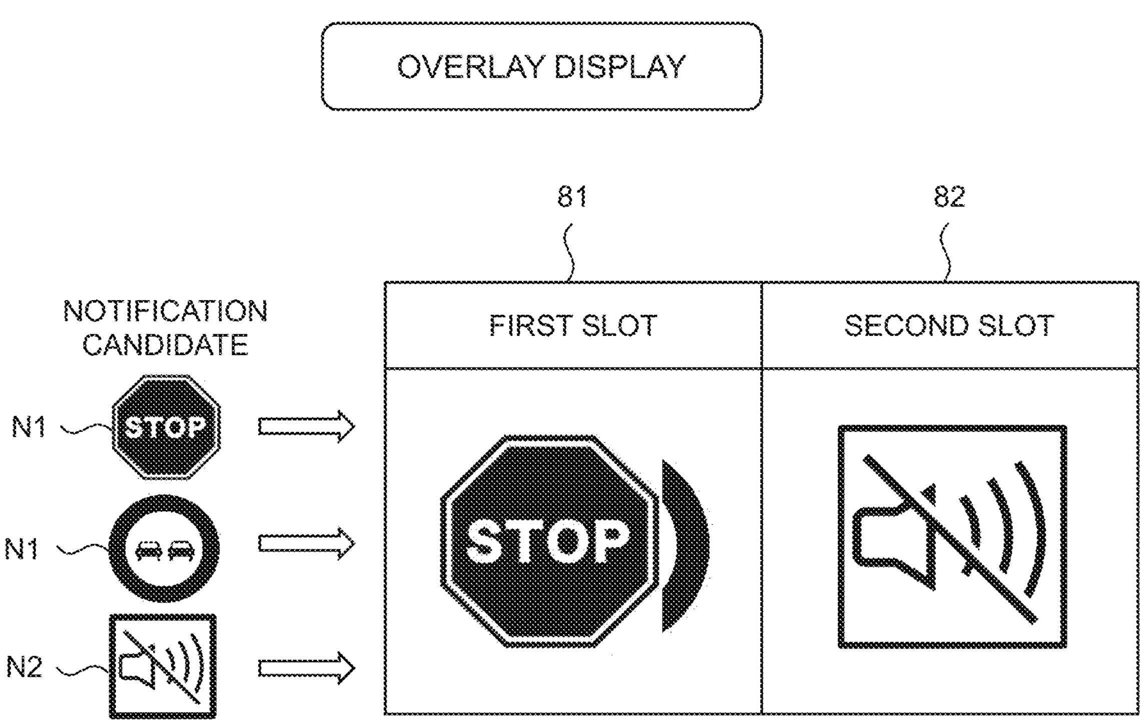
FIG. 10 is a conceptual diagram showing another example of an overlay display process according to an embodiment.

FIG. 10 is a conceptual diagram showing another example of the overlay display process. In the example shown in FIG. 10, the display device 80 has at least a first slot 81 and a second slot 82. The processor 110 displays the first type notification N1 in the first slot 81 and displays the second type notification N2 in the second slot 82.

A case where the notification candidates include a plurality of first type notifications N1 and the second type notification N2 will be considered. In this case as well, the processor 110 permits the overlay display of the plurality of first type notifications N1. That is, the processor 110 overlays and displays the plurality of first type notifications N1 in the first slot 81. Meanwhile, the processor 110 displays the second type notification N2 in the second slot 82. That is, also in this case, the overlay display of the first type notification N1 and the second type notification N2 is prohibited. Therefore, it is possible to display both the first type notification N1 and the second type notification N2 while suppressing the sense of strangeness and the confusion.

What is claimed is:

1. An information notification system comprising:

one or more processors configured to display a notification to a user of a vehicle on a display device, wherein a first type notification is a notification of road traffic information on a road or traffic around the vehicle, a second type notification is a notification of information not belonging to the road traffic information or a notification that no road traffic information is available, and the one or more processors are further configured to:

prohibit overlaying the first type notification and the second type notification when displayed on the display device;

when a single first type notification and a single second type notification are candidates for the notification and the display device has only a single display area for displaying the notification, select and display one of the first type notification and the second type notification in the single display area; and when a plurality of first type notifications and a plurality of second type notifications are candidates for the notification and the display device has only the single display area for displaying the notification, select and display one of the plurality of first type notifications and the plurality of second type notifications in the single display area, wherein notifications other than a foreground notification are partially hidden by the foreground notification such that it can be seen that there are a plurality of notifications but the content of the notifications other than the foreground notification cannot be seen.

2. The information notification system according to claim 1, wherein the one or more processors are further configured to permit overlaying the plurality of first type notifications when displayed on the display device.

3. The information notification system according to claim 1, wherein the second type notification includes a user setting notification regarding a setting customized by the user.

4. The information notification system according to claim 3, wherein a speed warning function is a function of issuing a warning to the user when a speed of the vehicle exceeds a speed limit, the speed warning function is turned on or off by the user, and the user setting notification is a notification that the speed warning function is turned off.

5. The information notification system according to claim 3, wherein when both the first type notification and the user setting notification are candidates for the notification and the display device has only the single display area for displaying the notification, the one or more processors are configured to display the user setting notification in the single display area without displaying the first type notification in the single display area.

6. The information notification system according to claim 1, wherein the road traffic information includes a speed limit, the first type notification includes a speed limit notification regarding the speed limit of a road on which the vehicle is traveling, and the second type notification includes an auxiliary notification that no information of the speed limit is available although there is a function of displaying the speed limit notification.

7. The information notification system according to claim 6, wherein when both the first type notification and the auxiliary notification are candidates for the notification and the display device has only the single display area for displaying the notification, the one or more processors are configured to display the first type notification in the single display area without displaying the auxiliary notification in the single display area.

8. The information notification system according to claim 1, wherein when the display device has a first display area and a second display area for displaying the notification, the one or more processors are further configured to display the first type notification in the first display area and to display the second type notification in the second display area.

9. The information notification system according to claim 8, wherein the one or more processors are further configured to permit overlaying the plurality of first type notifications in the first display area.

10. The information notification system according to claim 1, wherein the road traffic information includes at least one of a content of a traffic sign, a speed limit, presence or absence of a traffic signal, a signal indication, a traffic jam status, and presence or absence of an accident.

11. An information notification method for displaying a notification to a user of a vehicle on a display device, wherein a first type notification is a notification of road traffic information on a road or traffic around the vehicle, a second type notification is a notification of information not belonging to the road traffic information or a notification that no road traffic information is available, the information notification method comprising:

prohibiting overlaying the first type notification and the second type notification when displayed on the display device;

when a single first type notification and a single second type notification are candidates for the notification and the display device has only a single display area for displaying the notification, selecting and displaying one of the first type notification and the second type notification in the single display area; and when a plurality of first type notifications and a plurality of second type notifications are candidates for the notification and the display device has only the single display area for displaying the notification, selecting and displaying one of the plurality of first type notifications and the plurality of second type notifications in the single display area, wherein notifications other than a foreground notification are partially hidden by the foreground notification such that it can be seen that there are a plurality of notifications but the content of the notifications other than the foreground notification cannot be seen.

12. A non-transitory computer-readable recording medium storing an information notification program for displaying a notification to a user of a vehicle on a display device, wherein a first type notification is a notification of road traffic information on a road or traffic around the vehicle, a second type notification is a notification of information not belonging to the road traffic information or a notification that no road traffic information is available, the information notification program, when executed by a computer, causing the computer to execute:

prohibiting overlaying the first type notification and the second type notification when displayed on the display device;

when a single first type notification and a single second type notification are candidates for the notification and the display device has only a single display area for displaying the notification, selecting and displaying one of the first type notification and the second type notification in the single display area; and when a plurality of first type notifications and a plurality of second type notifications are candidates for the notification and the display device has only the single display area for displaying the notification, selecting and displaying one of the plurality of first type notifications and the plurality of second type notifications in the single display area, wherein notifications other than a foreground notification are partially hidden by the foreground notification such that it can be seen that there are a plurality of notifications but the content of the notifications other than the foreground notification cannot be seen.

* * * * *